United States Patent
Chester

(10) Patent No.: US 7,725,615 B1
(45) Date of Patent: May 25, 2010

(54) UNIVERSAL NETWORK DRIVER INTERFACE INSTALLER

(75) Inventor: Robert Chester, Auckland (NZ)

(73) Assignee: Symantec Corporation, Cupertino, CA (US)

( * ) Notice: Subject to any disclaimer, the term of this patent is extended or adjusted under 35 U.S.C. 154(b) by 792 days.

(21) Appl. No.: 11/047,372

(22) Filed: Jan. 31, 2005

(51) Int. Cl.
G06F 3/00 (2006.01)
G06F 15/177 (2006.01)
G06F 13/00 (2006.01)

(52) U.S. Cl. .......................... 710/10; 709/220; 719/328

(58) Field of Classification Search .................... 710/10
See application file for complete search history.

(56) References Cited

U.S. PATENT DOCUMENTS

| | | | |
|---|---|---|---|
| 5,444,850 A * | 8/1995 | Chang | 709/222 |
| 5,842,011 A * | 11/1998 | Basu | 713/2 |
| 6,247,081 B1 * | 6/2001 | Murata | 710/104 |
| 6,609,151 B1 * | 8/2003 | Khanna et al. | 709/222 |
| 6,633,929 B1 * | 10/2003 | Hyder et al. | 710/62 |
| 7,171,475 B2 * | 1/2007 | Weisman et al. | 709/227 |
| 7,251,725 B2 * | 7/2007 | Loison et al. | 713/1 |
| 2002/0144242 A1 * | 10/2002 | Owhadi | 717/137 |

OTHER PUBLICATIONS

Intel 82551QM Fast Ethernet Multifunction PCI/CardBus Controller, Apr. 23, 2003. Intel Corporation. pp. 1-2. Available: http://web.archive.org/web/20030423221000/http://www.intel.com/design/network/prodbrf/82551qm.htm.*
Robert Chester, Statement from Inventor.
Hewlett Packard, HP Pavilion & Compaq Presario Desktop PCs-Motherboard Specifications, Diable (K8N8X-LA PES).
NVIDIA, NVIDIA nForce3, http://www.nvidia.com/page/nf3.html.
Windows It Professional Text Thread, Creating TCP/Ip boot disk, Aug. 10, 2004, http://forums.windowsitpro.com/web/forum/messageview.aspx?catid=37&threadid=1507&highlight_key=y.
EMBOOTS, emBoot Managed PC Boot Agent on Disk, http://www.emboot.com/products_mba_on_disk5.htm.

* cited by examiner

Primary Examiner—Henry W. H. Tsai
Assistant Examiner—Michael Sun
(74) Attorney, Agent, or Firm—Hunton & Williams LLP

(57) ABSTRACT

Communicating via a network using a universal network driver interface is disclosed. It is determined whether a universal network device interface (UNDI) driver is installed. A UNDI driver is scanned for if it is determined that no UNDI driver is installed. In the event a UNDI driver is found, a PCI network device that is associated with the UNDI driver is scanned for. If a PCI network device associated with the UNDI driver is found, the UNDI driver is loaded and initialized for the PCI network device.

22 Claims, 5 Drawing Sheets

UNIVERSAL NETWORK DRIVER INTERFACE INSTALLER

FIELD OF THE INVENTION

The present invention relates generally to computers. More specifically, a universal network driver interface installer is disclosed.

BACKGROUND OF THE INVENTION

Network drivers for DOS (Disk Operating System) are becoming increasingly difficult to find for modern chipsets and cards, at least in part due to Microsoft™ Corporation's decision to no longer support DOS. However, DOS remains an extremely effective platform for providing an imaging and/or recovery environment. PC-DOS and other DOS variants can be used for this and other purposes. To use DOS for remote imaging, recovery, and/or other tasks a network driver is essential.

Currently specific network drivers for DOS have to be obtained for each family of chipsets/network cards. Availability is increasingly difficult but also the number of drivers continues to grow thus creating a configuration problem in setting up a DOS system, since each computer must be correctly matched with an appropriate network driver.

Therefore, there is a need for a way to install a network driver that can be used to support remote imaging, recovery, and/or other tasks in a DOS-provided environment that overcomes the difficulty in finding drivers for a new network interface and that does not require access to numerous drivers to support different hardware.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, or a computer readable storage medium. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Universal network interface installation is disclosed. In one embodiment, a computer system is booted locally into a DOS operating environment. A Universal Network Device Interface (UNDI) driver is installed for an associated network device. Network operations are performed using the UNDI driver and the associated network device.

Figure 1:
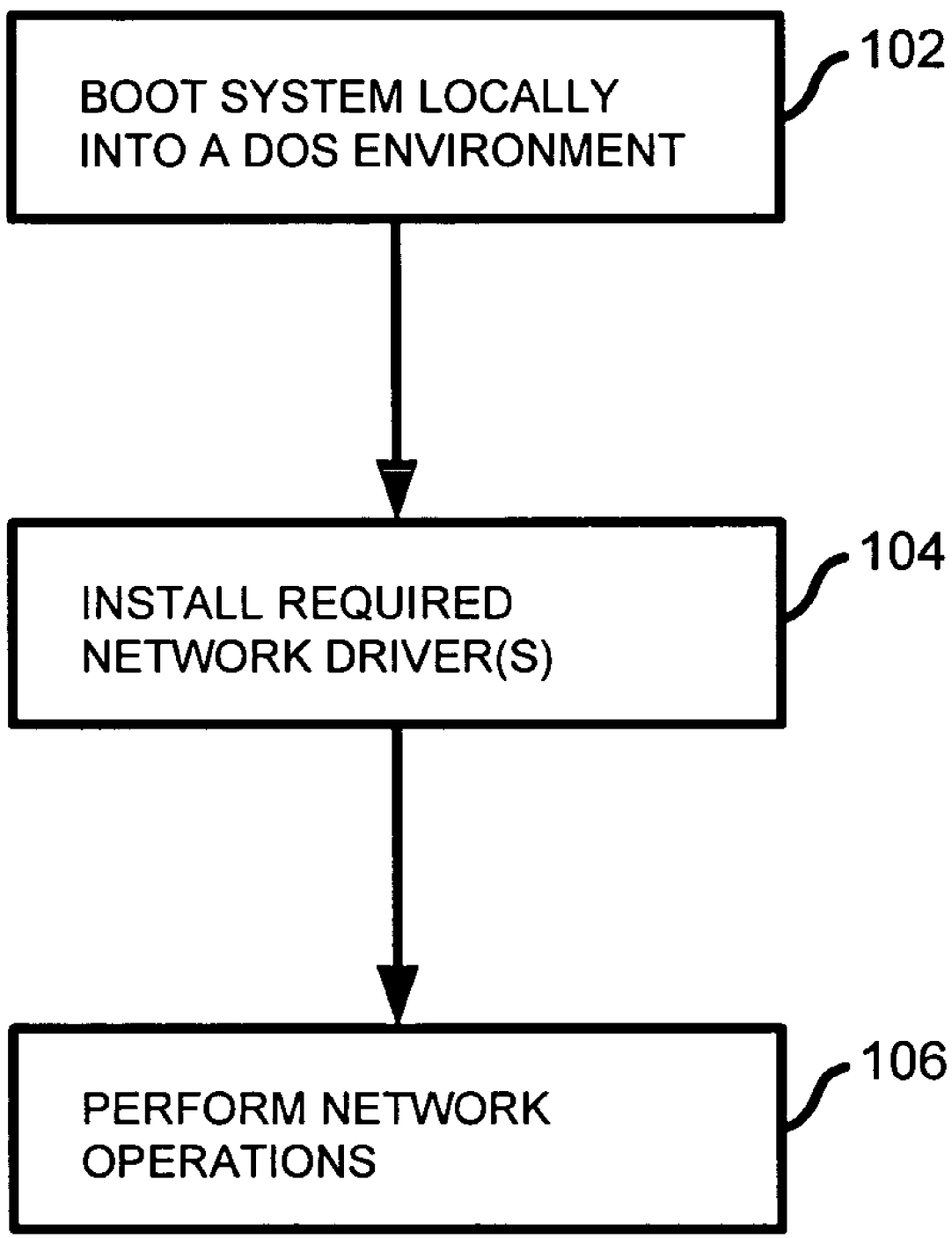
FIG. 1 illustrates an embodiment of a process for installing a universal network interface.

FIG. 1 illustrates an embodiment of a process for installing a universal network interface. In some embodiments, the process of FIG. 1 is used to enable a network operation to be performed by a DOS application after a local boot into a DOS environment. A system, e.g., a personal computer (PC) system, is booted locally into a DOS environment (102). Any required network driver(s) is/are installed (104). In one embodiment, 104 includes locating and installing a Universal Network Device Interface (UNDI) driver, if available and not already installed, and if required installing any other driver(s) that may be required for the DOS application (or other application, process, and/or device that needs to perform a network operation in the DOS environment) to perform the required network operation(s), as described more fully below. The network operation(s) required to be performed by the DOS application are performed (106).

Many modern PC's, especially in a corporate or other enterprise environment, have at least one UNDI driver available as part of the Preboot Execution Environment (PXE) stack. The PXE is an industry standard client/server interface that allows a networked computer that has not yet been loaded with an operating system, e.g., to be configured and booted remotely by an administrator. A remote boot using the PXE stack is sometimes referred to as a "network boot." The UNDI driver typically is contained with a PC or NIC (network interface card) option ROM (read only memory). The UNDI driver provides a standard network driver interface that the network boot environment (PXE) can use to communicate with a network boot server via a network. The UNDI driver is normally installed by the PC (or other computer) BIOS or the PXE base code during a network boot procedure as part of enabling a computer to boot from the network. The installation and initialization of the UNDI driver in the network boot context is described more fully in the PXE Specification version 2.1, which is incorporated herein by reference, and related specifications. Normally, the UNDI driver is only installed and initialized when a network boot is initiated. If the system is booted locally, the UNDI driver is not installed or initialized. In some embodiments, the procedures set forth in the PXE Specification and related specifications for installing and initializing the UNDI driver are implemented subsequent to a local boot into a DOS environment to make the UNDI driver available for use by a DOS application and/or other process or device running in the DOS environment, making the UNDI driver available to be used as a universal network driver without requiring a network boot.

Figure 2:
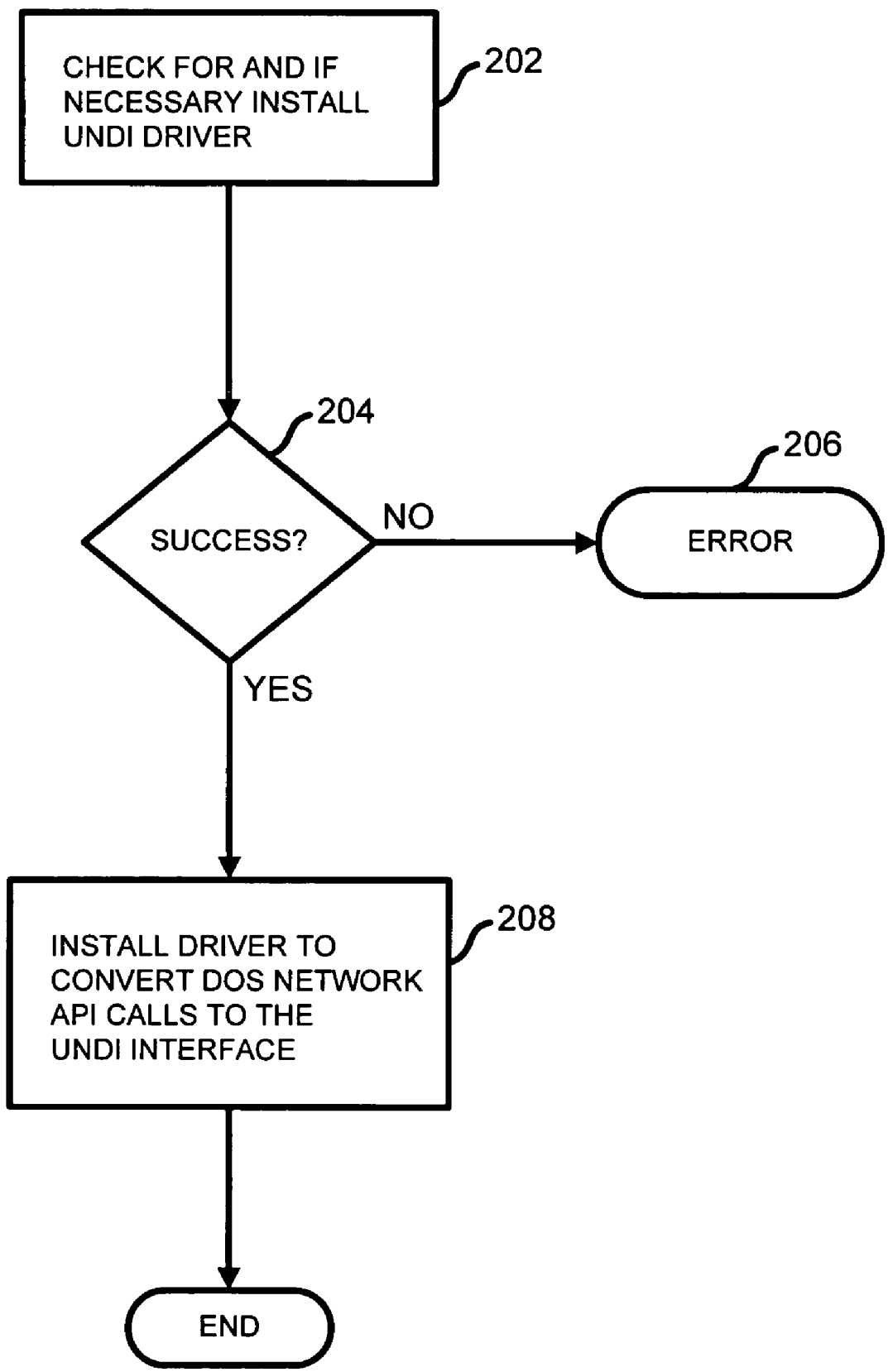
FIG. 2 illustrates an embodiment of a process for installing required network drivers.

FIG. 2 illustrates an embodiment of a process for installing required network drivers. In some embodiments, the process of FIG. 2 is used to implement 104 of FIG. 1. In the example shown in FIG. 2, a UNDI driver is checked for and, if necessary and available but not already installed, installed (202). If no UNDI driver could be found and/or installed (204), an error is generated (206) and appropriate exception handling performed (e.g., the network operation required to be performed may fail). If an UNDI driver was found and was either already installed or successfully installed in 202 (204), a network driver configured to convert DOS network API calls to the UNDI interface is installed (208), after which the process of FIG. 2 ends. In some embodiments, 208 includes installing a packet driver and/or an NDIS driver configured to convert DOS network API calls to the UNDI interface, as appropriate and/or required.

Figure 3A:
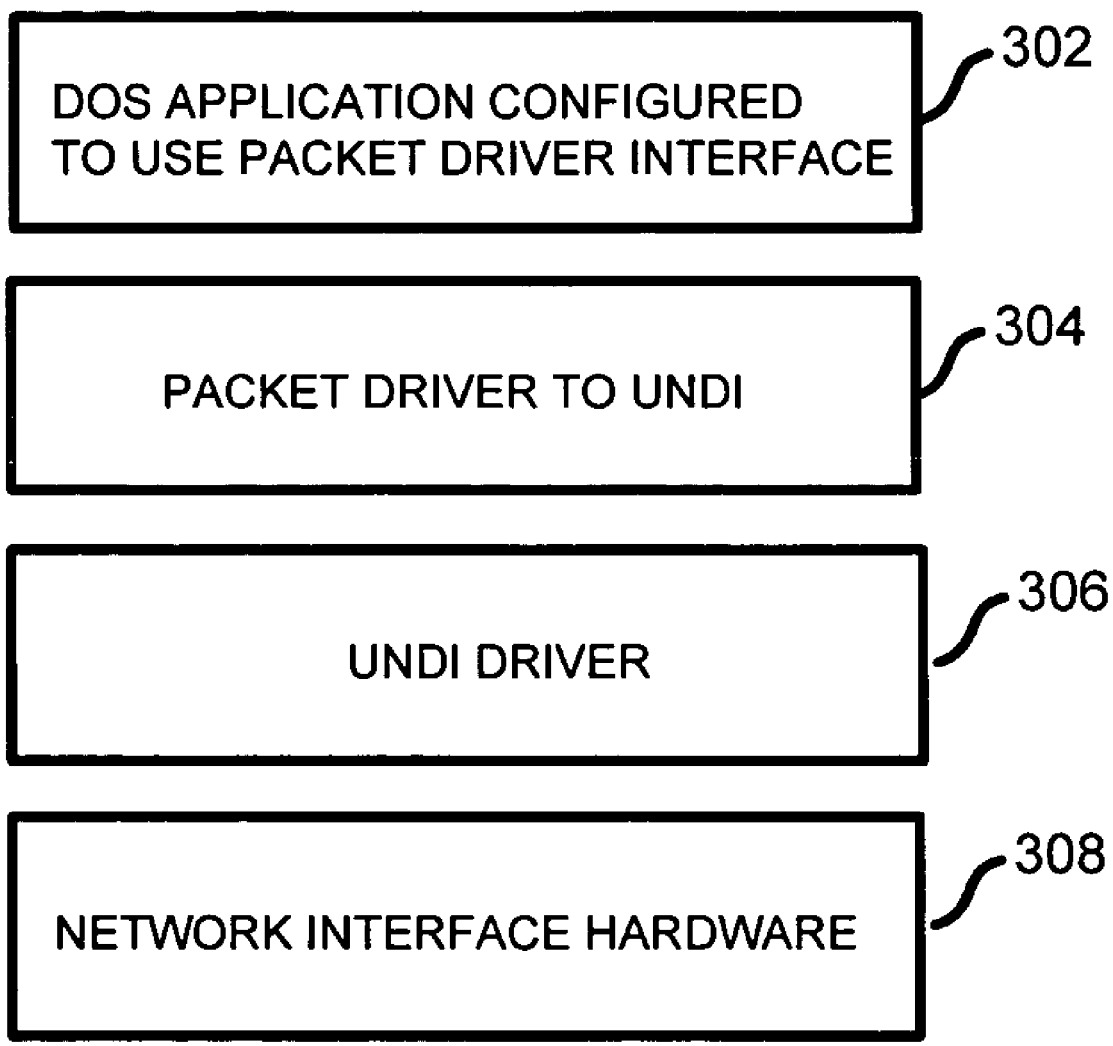
FIG. 3A illustrates an embodiment of a two-layer UNDI driver.

FIG. 3A illustrates an embodiment of a two-layer UNDI driver. A DOS application 302 configured to use a packet driver interface provides DOS network API calls to a packet driver 304 configured to convert DOS network API calls to the UNDI interface and provide converted calls to UNDI driver 306, which communicates with a network hardware interface 308, e.g., a network interface card (NIC) or a network chipset on a motherboard or other circuit board. In some embodiments, the two-layer driver of FIG. 3A is used by a DOS application to restore an image of a partition from a multicast session, e.g., using a commercially available program such as Symantec Ghost™.

Figure 3B:
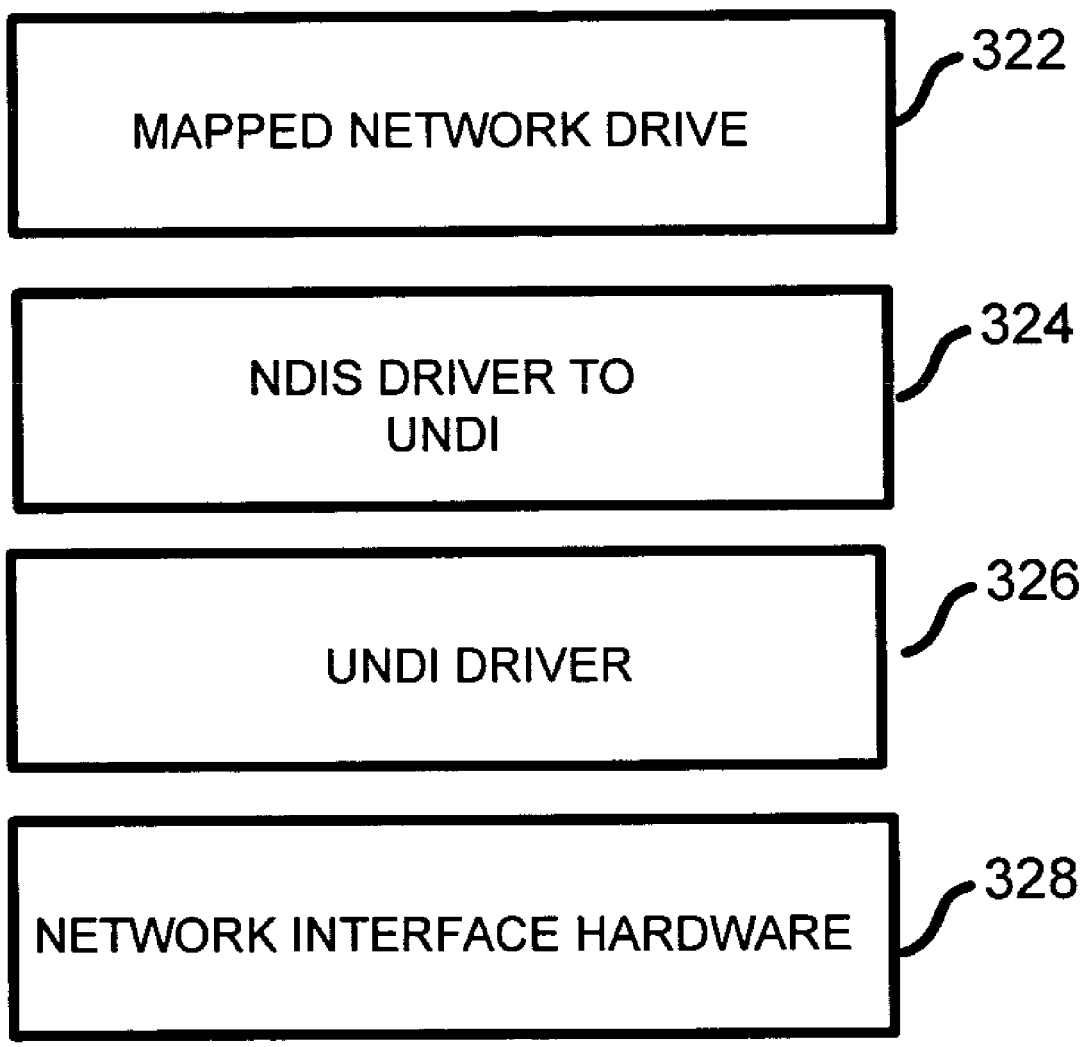
FIG. 3B illustrates an embodiment of a two-layer UNDI driver.

FIG. 3B illustrates an embodiment of a two-layer UNDI driver. A mapped network drive 322 provides DOS network API calls to a NDIS (Network Driver Interface Specification) driver 324 configured to convert DOS network API calls to the UNDI interface and provide converted calls to UNDI driver 326, which communicates with a network hardware interface 328. In some embodiments, the two-layer driver of FIG. 3B is used by a DOS application to write data to a mapped network drive, e.g., to store an image of a disk partition on a mapped network drive.

Figure 4:
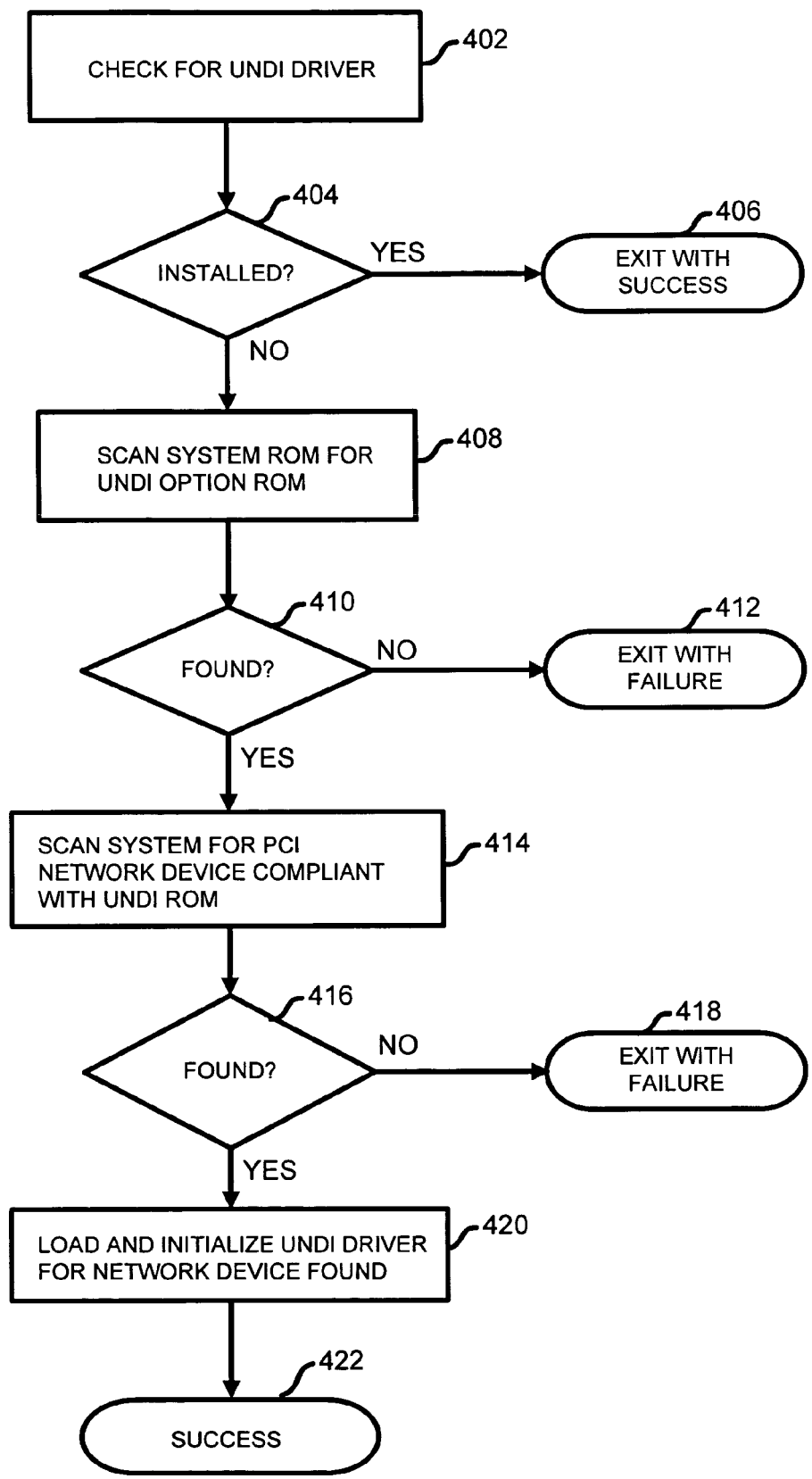
FIG. 4 illustrates an embodiment of a process for checking for and if necessary installing and initializing a UNDI driver.

FIG. 4 illustrates an embodiment of a process for checking for and if necessary installing and initializing a UNDI driver. In some embodiments, the process of FIG. 4 is used to implement 202 of FIG. 2. In the example shown in FIG. 4, a check is performed to see if a UNDI driver is already installed and initialized (402). If an installed and initialized UNDI driver is found (404), the process of FIG. 4 ends with a result of "success" (406), after which the previously installed and initialized UNDI driver may be used by an application or other process running in the DOS environment. A UNDI driver may be found in 402 to have been installed and initialized previously, e.g., during the course of a network boot or a prior iteration of the process of FIG. 4 or a similar process. If no installed and initialized UNDI driver is found (404), the system ROM is scanned for an UNDI option ROM (408). An UNDI option ROM typically will be included on a circuit board that includes network hardware, e.g., on the motherboard if it includes a PXE-compliant network chipset or on a PXE-compliant network interface card (NIC). In some embodiments, 408 includes scanning the UMB block from physical memory address 0xC0000 to physical memory address 0xF0000. A signature and header structure for the UNDI option ROM can be found in the PXE specification version 2.1 sections 4.3.1 and 4.5.1.1. In some embodiments if the system ROM is compressed it is decompressed, if possible, prior to scanning. In some embodiments, a decompression algorithm associated with the BIOS vendor is used to decompress the system ROM, if required. In some embodiments, if a UNDI ROM makes use of extended memory (e.g., using PMM—BIOS Post Memory Manager) when installed as an option ROM then the found UNDI option ROM is not used. If no usable UNDI option ROM is found (410), the process of FIG. 4 exits with a "failure" result (412). If at least one UNDI option ROM is found (410), the system is scanned for a PCI network device (e.g., a NIC or other hardware) compliant with the UNDI option ROM (414). Typically, an UNDI option ROM includes a description of the network device(s) it can control. In some embodiments, a vendor and device ID found in the UNDI option ROM header are used to scan for the associated PCI network device. In some embodiments, the PCI network class identifier is used to scan for the associated PCI network device if the device was not located using the vendor and device ID found in the UNDI option ROM header. If no network device compliant with the UNDI option ROM is found (416), the process of FIG. 4 exits with a "failure" result (418). If a network device compliant with the UNDI option ROM is found (416), the UNDI driver associated with the UNDI option ROM is loaded and initialized for the network device (420) and the process of FIG. 4 ends with a result of "success" (422). Once any other required drivers have been installed (see, e.g., 208 of FIG. 2), the installed and initialized UNDI driver may be used by any DOS application or other process to perform any required network operations via the network device for which the UNDI driver was loaded and initialized.

In some embodiments, if more than one UNDI option ROM is found in 408 and 410, e.g., because more than one PXE compliant network hardware device is present, the UNDI option ROM found first is used. In some embodiments, the UNDI option ROM found first is used by default unless a user has indicated that a device other than the one found first, e.g., a device specified by the user, should be used if available.

In some embodiments, the first time an UNDI option ROM is found its contents are read and stored in another location, e.g., saved to a file. Such storing could take place either when the UNDI option ROM is first found or after it has been loaded the first time but before it has been initialized. In such embodiments, in subsequent iterations of the process of FIG. 4 or its equivalent the UNDI driver is loaded from the file or other location in which it was stored. Such an approach may be useful, for example, where a network hardware device (e.g., NIC) has an UNDI driver available but does not have the UNDI option ROM installed on the card, as may be the case for example with a low cost network card, or if the UNDI ROM is not mapped into system ROM, e.g., if the UNDI ROM for an integrated LAN chipset is disabled in BIOS.

In some embodiments, the approach described herein is used to make the UNDI driver available for use to applications running in environments other than DOS without a network boot being required or performed, such as Windows XP™, Windows PE™, or Linux). For some such other operating systems modifications to the approach described herein may be required, such as extracting and storing the UNDI driver in a file or other location as described above and/or operating the host system processor in "real mode".

In some embodiments, in 408 the installed PCI network cards are scanned, via the PCI programming interface, for a valid UNDI expansion ROM. Such an approach may be useful, e.g., if the UNDI expansion ROM is available on a network adapter but has not been installed into system ROM during the computer's initial boot process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for communicating via a network, comprising:
 determining subsequent to a local boot into a DOS environment whether a universal network device interface (UNDI) driver is installed;
 if it is determined that no UNDI driver is installed, scanning for a UNDI driver;

in the event a UNDI driver is found, scanning for a PCI network device that is associated with the UNDI driver;

if a PCI network device associated with the UNDI driver is found, loading and initializing the UNDI driver for the PCI network device; and configuring a second driver to convert DOS network API calls to the UNDI driver and provide converted calls to the UNDI driver;

whereby the UNDI driver is installed and started without requiring a network boot and thereby becomes available to be used to provide network services to an application or other processes.

2. The method as recited in claim 1, wherein in the event a plurality of UNDI drivers are found, scanning for a PCI network device includes scanning for a PCI network device associated with a selected one of the plurality of UNDI drivers.

3. The method as recited in claim 2, wherein the selected one of the plurality of UNDI drivers is the one found first.

4. The method as recited in claim 2, wherein the selected one of the plurality of UNDI drivers is one selected by a user to be used.

5. The method as recited in claim 1, wherein scanning for a UNDI driver includes scanning for a UNDI option ROM.

6. The method as recited in claim 1, wherein scanning for a UNDI driver includes scanning system ROM for a UNDI option ROM.

7. The method as recited in claim 1, wherein scanning for a UNDI driver includes scanning an installed PCI network card for a valid UNDI expansion ROM via the PCI programming interface.

8. The method as recited in claim 1, wherein the second network driver comprises a packet driver.

9. The method as recited in claim 1, wherein the second network driver comprises a NDIS driver.

10. The method as recited in claim 1, wherein the second driver is a packet driver, further comprising:

installing the second packet driver.

11. A system for communicating via a network, comprising:

a processor configured to:

determine subsequent to a local boot into a DOS environment whether a universal network device interface (UNDI) driver is installed;

scan for a UNDI driver if it is determined that no UNDI driver is installed;

in the event a UNDI driver is found, scan for a PCI network device that is associated with the UNDI driver;

if a PCI network device associated with the UNDI driver is found, load and initialize the UNDI driver for the PCI network device; and configure a second driver to convert DOS network API calls to the UNDI driver and provide converted calls to the UNDI driver; and a memory configured to provide instructions to the processor;

whereby the UNDI driver is installed and started without requiring a network boot and thereby becomes available to be used to provide network services to an application or other processes.

12. The system as recited in claim 11, wherein in the event a plurality of UNDI drivers are found, the processor is configured to scan for a PCI network device associated with a selected one of the plurality of UNDI drivers.

13. The system as recited in claim 11, wherein the processor is configured to scan for a UNDI driver by scanning for a UNDI option ROM.

14. The system as recited in claim 11, wherein the processor is configured to scan for a UNDI driver by scanning system ROM for a UNDI option ROM.

15. The system as recited in claim 11, wherein the processor is configured to scan for a UNDI driver by scanning an installed PCI network card for a valid UNDI expansion ROM via the PCI programming interface.

16. The system as recited in claim 11, wherein the second driver is a packet driver, wherein the processor is further configured to:

install the second packet driver.

17. A computer program product for communicating via a network, the computer program product being embodied in a computer readable storage medium and comprising computer instructions for:

determining subsequent to a local boot into a DOS environment whether a universal network device interface (UNDI) driver is installed;

if it is determined that no UNDI driver is installed, scanning for a UNDI driver;

in the event a UNDI driver is found, scanning for a PCI network device that is associated with the UNDI driver;

if a PCI network device associated with the UNDI driver is found, loading and initializing the UNDI driver for the PCI network device; and configuring a second driver to convert DOS network API calls to the UNDI driver and provide converted calls to the UNDI driver;

whereby the UNDI driver is installed and started without requiring a network boot and thereby becomes available to be used to provide network services to an application or other processes.

18. The computer program product as recited in claim 17, wherein in the event a plurality of UNDI drivers are found, scanning for a PCI network device includes scanning for a PCI network device associated with a selected one of the plurality of UNDI drivers.

19. The computer program product as recited in claim 17, wherein scanning for a UNDI driver includes scanning for a UNDI option ROM.

20. The computer program product as recited in claim 17, wherein scanning for a UNDI driver includes scanning system ROM for a UNDI option ROM.

21. The computer program product as recited in claim 17, wherein scanning for a UNDI driver includes scanning an installed PCI network card for a valid UNDI expansion ROM via the PCI programming interface.

22. The computer program product as recited in claim 17, wherein the second driver is a packet driver, further comprising computer instructions for:

installing the second packet driver.

* * * * *